United States Patent
Kapinos et al.

(10) Patent No.: US 9,715,256 B2
(45) Date of Patent: Jul. 25, 2017

(54) OPTICALLY CONNECTED HINGE

(71) Applicant: Lenovo (Singapore) Pte. Ltd., Singapore (SG)

(72) Inventors: Robert James Kapinos, Durham, NC (US); Joseph Bryan Morris, Cary, NC (US); Scott Wentao Li, Cary, NC (US); Joaquin F. Luna, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/871,121

(22) Filed: Sep. 30, 2015

(65) Prior Publication Data
US 2017/0090525 A1 Mar. 30, 2017

(51) Int. Cl.
*H04B 10/00* (2013.01)
*G06F 1/16* (2006.01)
*H04B 10/40* (2013.01)

(52) U.S. Cl.
CPC .......... *G06F 1/1683* (2013.01); *H04B 10/40* (2013.01)

(58) Field of Classification Search
CPC ...................................... H04B 10/40
See application file for complete search history.

(56) References Cited

U.S. PATENT DOCUMENTS

| | | | | |
|---|---|---|---|---|
| 5,889,602 A * | 3/1999 | Johnson | ............... | G06F 1/1616 398/115 |
| 6,470,132 B1 * | 10/2002 | Nousiainen | .......... | H04B 10/801 385/146 |
| 6,832,014 B1 * | 12/2004 | Vogley | ............... | G02B 6/12007 359/107 |
| 7,203,425 B1 * | 4/2007 | Keller | ............... | H04B 10/1143 398/123 |
| 7,636,523 B2 * | 12/2009 | Schorpp | ............ | H04B 10/1143 398/130 |
| 2006/0082518 A1 * | 4/2006 | Ram | ...................... | G06F 1/1601 345/1.1 |
| 2006/0286836 A1 * | 12/2006 | Ku | ........................ | G06F 1/1622 439/165 |
| 2007/0150764 A1 * | 6/2007 | Chen | ..................... | G06F 1/1616 713/300 |
| 2008/0070649 A1 * | 3/2008 | Uchida | ............... | H04M 1/0216 455/575.4 |
| 2009/0067428 A1 * | 3/2009 | Balandin | ................ | H04L 45/00 370/392 |
| 2015/0201528 A1 * | 7/2015 | Lebo | ..................... | H04B 10/40 361/703 |
| 2015/0381271 A1 * | 12/2015 | Li | ........................ | H04B 10/071 398/21 |
| 2016/0320809 A1 * | 11/2016 | Rosen | ....................... | E05D 3/02 |
| 2017/0045917 A1 * | 2/2017 | Rosen | ................... | G06F 1/1669 |

* cited by examiner

*Primary Examiner* — Danny Leung
(74) *Attorney, Agent, or Firm* — Ference & Associates LLC

(57) ABSTRACT

One embodiment provides an apparatus, including: a transmitter; and a hinge, comprising: a receiver; the receiver being optically coupled to the transmitter and receiving data from the transmitter. Other aspects are described and claimed.

20 Claims, 3 Drawing Sheets

OPTICALLY CONNECTED HINGE

BACKGROUND

Electronic devices (also referred to herein generally as information handling devices or simply devices) such as laptops, etc., are often formed as a clamshell in which two parts are connected via a hinge. Other electronic devices are connected in a similar fashion or otherwise have moving parts, e.g., so-called "flip" phones, hybrid devices such as the LENOVO YOGA computing device, and the like.

For such devices, the hinge or hinges (or connection(s) by any other name and considered and described as included in the term hinge as used herein) that connect the two parts and offer rotation or relative movement also act in many instances as a conduit through which wiring is passed. For example, in a clamshell laptop, the hinge is used to feed wiring from the base portion of the device to the display portion, e.g., video data for the display screen. Depending on the nature of the device, the wiring may be complex and handle bi-directional traffic and signals for various types of data transmission.

BRIEF SUMMARY

In summary, one aspect provides an apparatus, comprising: a transmitter; and a hinge, comprising: a receiver; the receiver being optically coupled to the transmitter and receiving data from the transmitter.

Another aspect provides a device, comprising: a processor; a memory operatively coupled to the processor; a transmitter operatively coupled to the processor; a base housing part enclosing the processor and the memory; a separate housing part; one or more hinges physically coupling the base housing part and the separate housing part; and the one or more hinges comprising: a receiver; the receiver being optically coupled to the transmitter and receiving data from the transmitter; the memory device storing instructions executable by the processor to: communicate data via the transmitter to the receiver.

A further aspect provides a device, comprising: a processor; a memory operatively coupled to the processor; a transmitter operatively coupled to the processor; a base housing part enclosing the processor and the memory; a separate housing part; two hinges physically coupling the base housing part and the separate housing part; and each hinge, comprising: a receiver; the receiver being optically coupled to the transmitter and receiving data from the transmitter; the memory device storing instructions executable by the processor to: communicate data via the transmitter to the receiver.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
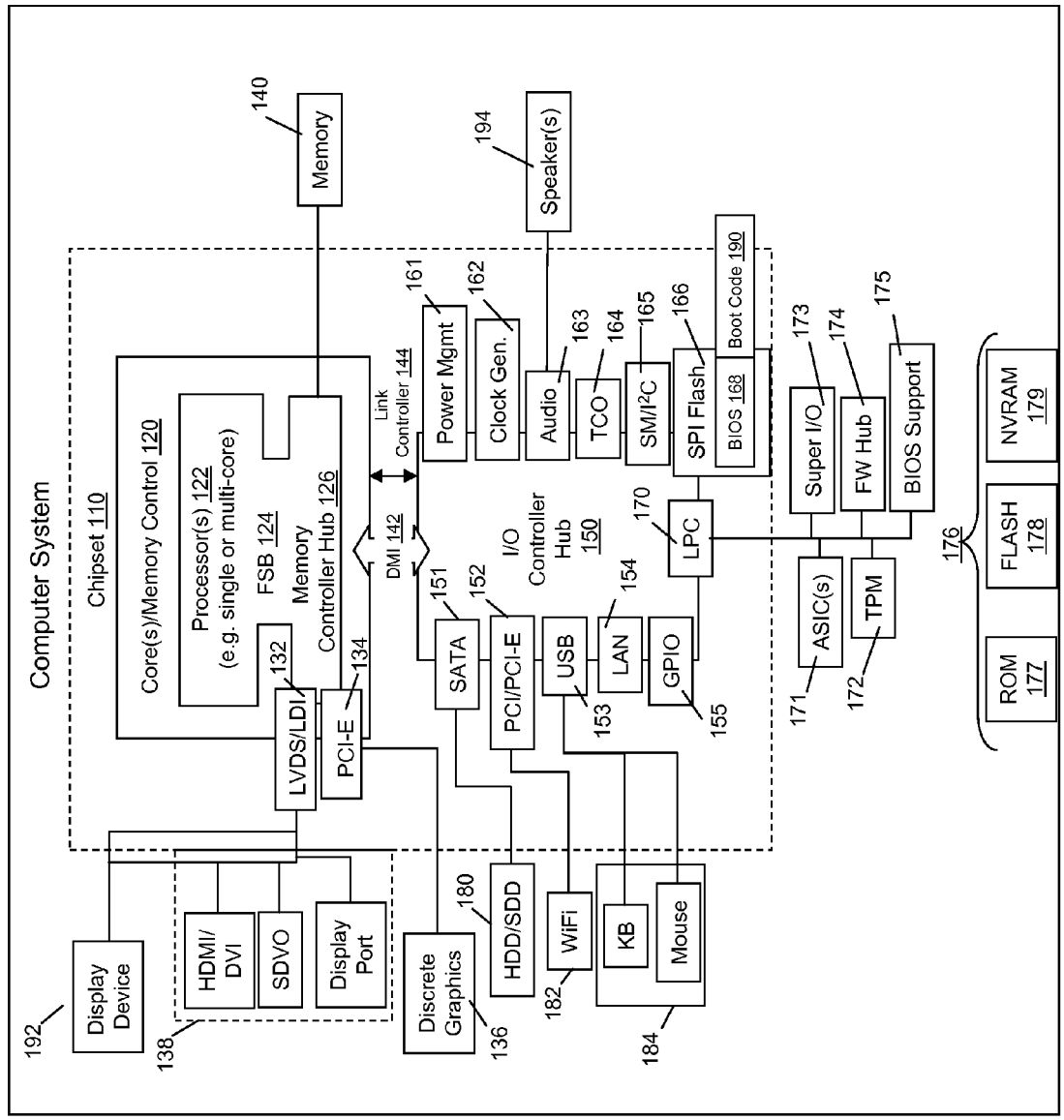
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Making hinge(s), e.g., for laptop computers or other electronic devices having moving parts that are operatively coupled, is difficult because often large numbers of wires must be routed from the lower or base unit to the separate, e.g., top unit, with the wires being routed inside the hinge. These wires tend to fret and break over time due to flexing motion and friction, causing shorts. Complicated hollow hinges are somewhat better, but are also weaker and/or cost more due to increased strength requirements for the materials.

Multiplexing signals into one wire does not overcome flexion problems. Radio signaling from bottom to top has issues, e.g., channel overlap between units and EMF interference. Direct contact couplings work, but only in certain positions. Through air signaling also has problems, e.g., dust on emitters may cause disturbances and through air signaling often proves difficult to keep a proper alignment between emitter and receiver, particularly in certain form factors.

An embodiment therefore uses a high-speed optical transmitter (e.g., attached to the base portion) and a corresponding optical receiver (e.g., attached to the separate or lid portion). Data communicated from one part to another may be multiplexed into this optical link. The transmitter and receiver may be separated, e.g., by a very small air gap (e.g., on the order of several millimeters), and optically sealed from the outside world. These components may be aligned with each other, e.g., along a center axis of the hinge, so that as the hinge rotates they do not move with respect to each other in terms of optical or functional alignment. In an embodiment, a second set of transmitter and receiver, with the direction reversed, exists to carry data for example back from the separate or lid portion to the base portion, e.g., in a second hinge or on the other side of the same hinge, etc.

The terms transmitter and receiver, as used herein, may include the transmitter and receiver components, respectively, but also may include additional components, e.g., light guides, fiber optic(s), etc., that form a "transmitter" and a "receiver" unit or units.

The illustrated example embodiments will be best understood by reference to the figures. The following description is intended only by way of example, and simply illustrates certain example embodiments.

While various other circuits, circuitry or components may be utilized in information handling devices, FIG. 1 depicts a block diagram of an example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 180), a PCI-E interface 152 (for example, for wireless connections 182), a USB interface 153 (for example, for devices 184 such as a digitizer, keyboard, mice, cameras, phones, microphones, storage, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling device circuitry, as for example outlined in FIG. 1, may be used in personal electronic devices generally. Specifically, an embodiment may be implemented in a device having circuitry such as that outlined in FIG. 1 and including two or more moving components coupled by a hinge or hinges.

Figure 2:
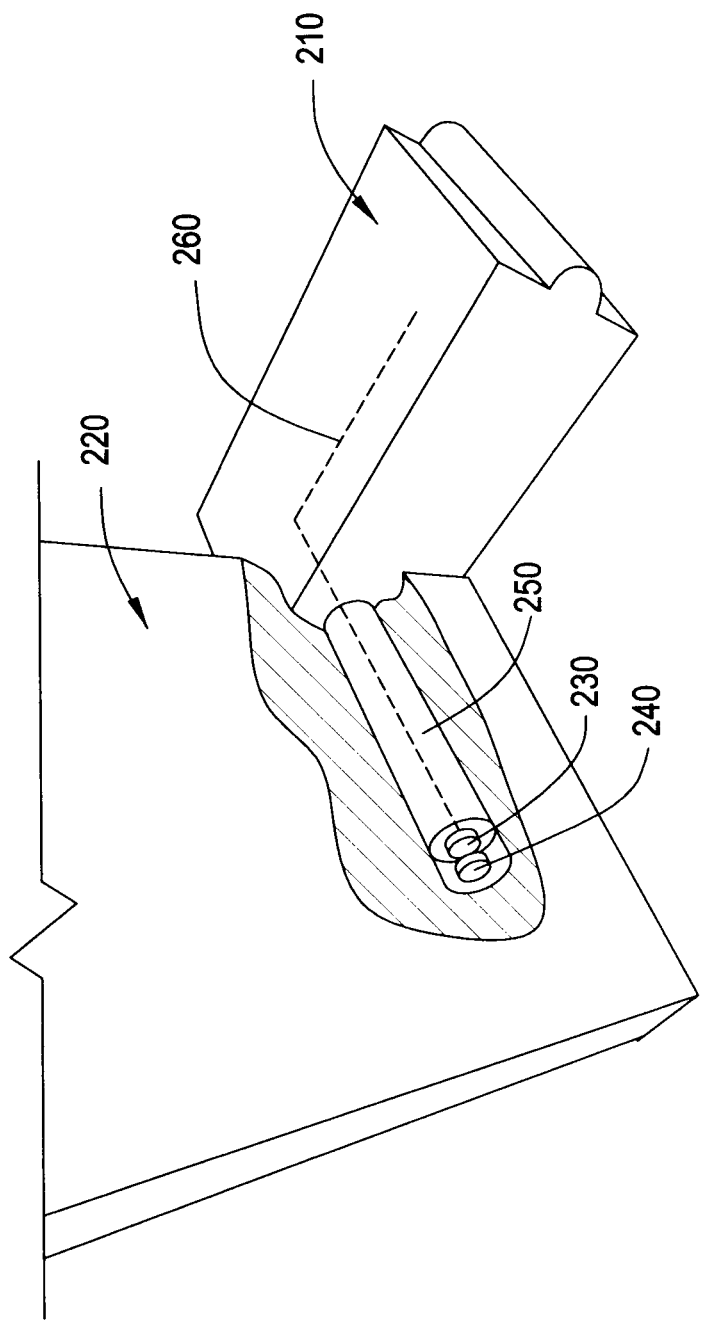
FIG. 2 illustrates an example perspective view of an optically coupled hinge.

Referring to FIG. 2, an example of an optically coupled hinge is displayed. In the example illustrated in FIG. 2, the hinge is formed of two parts (generally indicated at 210 and 220); however, it will be readily apparent that the hinge may take the form of a single part. Moreover, the hinge parts 210, 220 may be formed as independent parts, e.g., that attach to a base portion of a device and a display portion of the device, respectively. However, the hinge parts 210, 220 may be integrally formed with the upper and lower parts of the device, e.g., as sub-parts of the base portion and display portion of a device.

The example of FIG. 2 illustrates that an emitter 230 and a receiver or sensor 240 are aligned in the hinge, e.g., separated by a small air gap. The emitter 230 and the receiver 240 may for example be aligned along the axis of a hinge pin 250 such that, on rotation of the display or upper part of the device (e.g., generally indicated at 220) and the lower or base part (e.g., generally indicated at 210), the emitter 230 and the receiver 240 do not come out of optical alignment. The emitter 230 and/or receiver 240 may or may not rotate along with the respective hinge parts 210, 220, depending on how each is mounted or affixed to the respective hinge or device part 210, 220.

The case wiring indicated at 260 may thus lead into the hinge pin 250 (or like component depending on the nature of the hinge configuration) such that it terminates at the emitter 230. That is, the case wiring 260 need not traverse the gap (e.g., air gap) and extend into the separate, e.g., display, part, again indicated generally at 220. This relieves the case wiring 260 from being subjected to any friction or bending as the parts 210 and 220 are rotated (or otherwise moved) about one another. As will be appreciated by those having ordinary skill in the art, the case wiring may carry data signals from a system processor and be operatively coupled to the emitter 230, e.g., a light emitting diode (LED), such that data may be transmitted to the receiver (e.g., LED detector) and thus to the upper or display part. It will be readily apparent to those having ordinary skill in the art that a second emitter and receiver may be arranged, e.g., in the same or different (e.g., second) hinge such that the bi-directional communication may be achieved, e.g., data transmission from the upper or display part 220 to the lower or base part 210.

Figure 3:
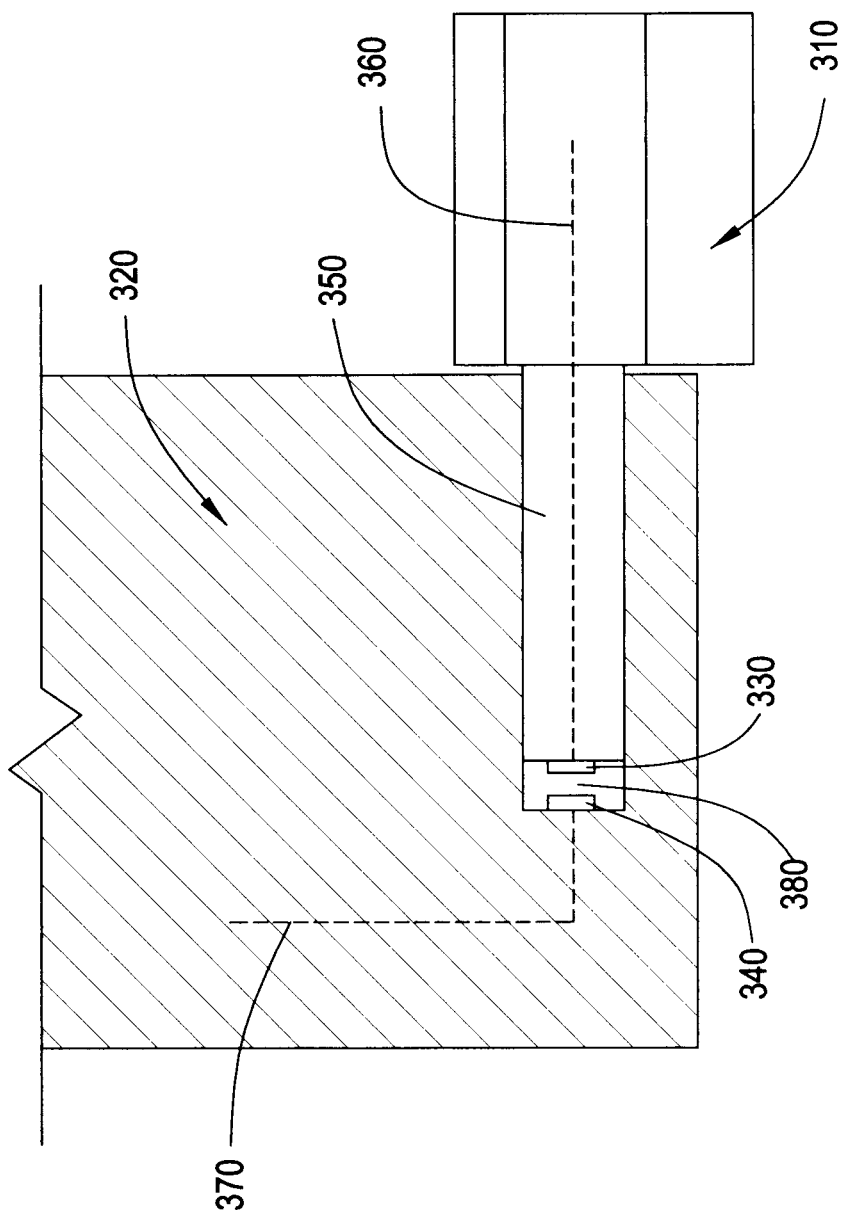
FIG. 3 illustrates a plan view of an example optically coupled hinge.

Turning to FIG. 3, as illustrated, a top part 320 and lower part 310 are operatively connected via an emitter 330 and a receiver or sensor 340, separated by an air gap 380. Here, the case wiring 360 and the top wiring 370 are operatively connected by a communication link provided by the emitter 330 and the receiver 340, e.g., communicating optically via air gap 380. As shown, the hinge pin 350 and insert area therefor may be used to enclose, e.g., from external or ambient light, the emitter 330 and the receiver 340. As will be appreciated, this shields the emitter 330 and receiver 340 such that optical communication (e.g., using visible or other wavelength of light signaling) is enabled. Further, as may be appreciated, such a hinge may rotate about an axis of rotation running along the hinge pin 350. The placement of the emitter 330 and the receiver 340 ensures that these components remain aligned with one another as the top part 320 and bottom part 310 move relative to one another.

Furthermore, it may again be appreciated form review of FIG. 1 and FIG. 2 that the wiring need not physically extend between the upper and lower parts. Rather, the wiring may terminate in emitter and receiver such that the upper and lower part rotate without a wired connection yet remain in operative coupling with one another with respect to data communications.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

As used herein, the singular "a" and "an" may be construed as including the plural "one or more" unless clearly indicated otherwise.

The invention claimed is:

1. An apparatus, comprising:
a transmitter; and
a hinge that rotates about an axis of rotation, comprising:
 a hinge pin aligned with the axis of rotation; and
 a receiver aligned along the axis of rotation of the hinge pin;
 the receiver being optically coupled to the transmitter and receiving data from the transmitter.

2. The apparatus of claim 1, wherein:
the hinge comprises two parts;
the transmitter is disposed in a first hinge part; and
the receiver is disposed in a second hinge part.

3. The apparatus of claim 1, wherein the transmitter and the receiver are separated by an air gap.

4. The apparatus of claim 1, wherein the transmitter and the receiver operatively communicate via light transmission.

5. The apparatus of claim 1, where the transmitter comprises a light emitting diode.

6. The apparatus of claim 1, wherein the transmitter and receiver are shielded from visible light.

7. The apparatus of claim 1, further comprising a housing, wherein the hinge attaches to the housing.

8. The apparatus of claim 7, wherein the housing comprises two housing parts, wherein the transmitter is disposed in one of the two housing parts.

9. The apparatus of claim 1, wherein the hinge is formed integral to a device casing and a display part.

10. The apparatus of claim 1, wherein the transmitter and the receiver are substantially aligned about the axis of rotation of the hinge.

11. A device, comprising:
a processor;
a memory operatively coupled to the processor;
a transmitter operatively coupled to the processor;
a base housing part enclosing the processor and the memory;
a separate housing part;
one or more hinges physically coupling the base housing part and the separate housing part, wherein the one or more hinges rotate about an axis of rotation;
the one or more hinges comprising:
 a hinge pin aligned with the axis of rotation; and
 a receiver aligned along the axis of rotation of the hinge pin;
the receiver being optically coupled to the transmitter and receiving data from the transmitter;
the memory device storing instructions executable by the processor to:
communicate data via the transmitter to the receiver.

12. The device of claim 11, wherein:
the hinge comprises two parts;
the transmitter is disposed in a first hinge part; and
the receiver is disposed in a second hinge part.

13. The device of claim 12, wherein:
the first part is formed in one of the base housing part and the separate housing part; and
the second part is formed in another of the base housing part and the separate housing part.

14. The device of claim 12, wherein the first hinge part and the second hinge part are integrally formed in one or more of the base housing part and the separate housing part.

15. The device of claim 11, wherein the separate housing part comprises a display.

16. The device of claim 11, wherein the transmitter and the receiver are separated by an air gap.

17. The device of claim 11, wherein the transmitter and the receiver operatively communicate via light transmission.

18. The device of claim 11, where the transmitter comprises a light emitting diode.

19. The device of claim 11, wherein the transmitter and receiver are shielded from visible light.

20. A device, comprising:
a processor;
a memory operatively coupled to the processor;
a transmitter operatively coupled to the processor;
a base housing part enclosing the processor and the memory;
a separate housing part;
two hinges physically coupling the base housing part and the separate housing part, wherein the two hinges rotate about an axis of rotation; and
each hinge, comprising:
 a hinge pin aligned with the axis of rotation
 a receiver aligned along the axis of rotation of the hinge pin;
the receiver being optically coupled to the transmitter and receiving data from the transmitter;
the memory device storing instructions executable by the processor to:
communicate data via the transmitter to the receiver.

* * * * *